(12) United States Patent
Henderson, II (10) Patent No.: US 9,045,176 B1
(45) Date of Patent: Jun. 2, 2015

(54) UNDER TRAILER AERODYNAMIC CONTROL SYSTEM

(71) Applicant: Robert R Henderson, II, Salem, OR (US)

(72) Inventor: Robert R Henderson, II, Salem, OR (US)

( * ) Notice: Subject to any disclaimer, the term of this patent is extended or adjusted under 35 U.S.C. 154(b) by 0 days.

(21) Appl. No.: 14/197,214

(22) Filed: Mar. 5, 2014

(51) Int. Cl.
*B62D 25/02* (2006.01)
*B62D 35/02* (2006.01)

(52) U.S. Cl.
CPC ........................................ *B62D 35/02* (2013.01)

(58) Field of Classification Search
CPC ....................................................... B62D 37/02
USPC ............................................ 296/180.1–180.5
See application file for complete search history.

(56) References Cited

U.S. PATENT DOCUMENTS

| | | | |
|---|---|---|---|
| 4,262,953 A | | 4/1981 | McErlane |
| 4,486,046 A | | 12/1984 | Whitney et al. |
| 4,640,541 A | | 2/1987 | FitzGerald et al. |
| 7,093,889 B2 * | | 8/2006 | Graham ..................... 296/180.4 |
| 2002/0021023 A1 * | 2/2002 | Leban ........................ 296/180.1 |
| 2003/0057736 A1 * | 3/2003 | Long et al. ................. 296/180.4 |
| 2004/0256884 A1 * | 12/2004 | Schwartz .................... 296/180.4 |
| 2005/0161976 A1 * | 7/2005 | Ortega et al. .............. 296/180.4 |
| 2007/0120397 A1 * | 5/2007 | Layfield et al. ............ 296/180.4 |
| 2008/0061597 A1 * | 3/2008 | Reiman et al. ............. 296/180.4 |
| 2008/0093887 A1 * | 4/2008 | Wood ......................... 296/180.4 |
| 2008/0238139 A1 * | 10/2008 | Cardolle .................... 296/180.4 |
| 2009/0195017 A1 * | 8/2009 | Wood ......................... 296/180.4 |
| 2009/0212595 A1 | 8/2009 | Heppel et al. |
| 2010/0066123 A1 | 3/2010 | Ortega et al. |
| 2011/0068605 A1 | 3/2011 | Domo et al. |
| 2011/0204677 A1 | 8/2011 | Wood et al. |
| 2012/0319428 A1 * | 12/2012 | Wood ......................... 296/180.4 |

* cited by examiner

*Primary Examiner* — Lori L Lyjak

(57) ABSTRACT

An under trailer aerodynamic control system that increases air mass, organization and velocity with forward mounted airflow modifying directional panels and a rear airflow modifier mounted in a firm and movable manner for location near the underneath side of a truck trailer forward of the trailer tires and axles to better manage airflow around the trailer tire and axle assembly. In operation, the rear mounted airflow modifier collects the airflow from the forward mounted modifiers and routes impinging air to exit between the trailer tires and well past the end of the trailer for controlled road spray and splash while keeping tires and brakes running cooler and decreasing parasitic drag of the trailer as it moves along the highway while reducing driver fatigue due to improved handling characteristics.

23 Claims, 11 Drawing Sheets fig 3

Fig. 4 fig 5

UNDER TRAILER AERODYNAMIC CONTROL SYSTEM

CROSS-REFERENCES TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

STATEMENT REGARDING PRIOR DISCLOSURE BY THE INVENTOR

The invention has not been for sale to the public outside of one year before this patent filing. The total concept was not discovered until testing conducted on Oct. 11, 2013. There has been no full disclosure prior to this patent filling.

BACKGROUND OF THE INVENTION

1. Field of the Invention

This invention relates to the reduction of aerodynamic drag for moving ground vehicles; specifically to an improved method and devices for the reduction of aerodynamic drag and for improved performance and stability of ground vehicles by stabilizing and increasing the mass and velocity of the airflow passing under a vehicle.

2. Description of the Related Art

There have been many attempts to reduce the aerodynamic drag of a tractor-trailer system with the assumption that there is a great amount of airflow in the area behind the tractor drive tires, between the undercarriage of the trailer and the roadway, and all the way to the trailer tire assembly. Because the trailer is connected behind the tractor, the tractor interrupts the airflow. A smooth stream-like flow does not exist but in fact it is comprised of an unsteady, chaotic nature moving along with the tractor-trailer components at a reduced speed compared to the tractor-trailer speed through the air with some momentary airflow components moving in a forward direction relative to the forward motion of the vehicle.

Many have taught that the best way to improve tractor-trailer aerodynamics is to block the air from entering under the trailer by installing side plates—Wood et al., U.S. Pub. No. 2011/0204677, 2012/0319428, 2009/0195017 and Heppel et al., U.S. Pub. No. 2009/0212595 for examples.

Others teach that aerodynamic shields can be used to gain aerodynamic improvements such as seen by FitzGerald, U.S. Pat. No. 4,640,541, Ortega et al., U.S. Pub. No. 2010/0066123 and McErlane, U.S. Pat. No. 4,262,953.

Still others teach that some other airstream deflectors as Domo et al. U.S. Pub. No. 2011/0068605 and Whitney et al., U.S. Pat. No. 4,486,046 can provide aerodynamic benefits by deflecting the air under the trailer. The problem is that the airflow found under a trailer is comparatively slow moving and very chaotic in nature. Without introducing any airflow straighteners or other flow enhancement techniques these devices are nearly worthless. All of the prior teachings fail to realize that the airflow under a truck trailer moving through the air at highway speeds is really comprised of an unsteady, unorganized flow and at reduced speeds compared to the vehicle's operational velocity.

All of these teachings assume that the airflow under the trailer will be moving past the components in the under-trailer area in some organized manner at some speed near the tractor-trailer road velocity. This is not the case. The chaotic, turbulent airflow in the region behind the tractor tires, between the roadway and trailer undercarriage and all the way back to some distance behind the trailer rear doors is moving much less then the tractor-trailer's road speed velocity. The air is being dragged along by the physical components of the tractor and trailer assemblies. Live over-the-road smoke testing reveals that the turbulent airflow under the trailer is so chaotic that it has some components that actually move briefly forward, towards the front of the vehicle. This fact dispels the notion that the airflow moves past the undercarriage area at the same speed as the vehicle speed. It also dispels the idea that the air is moving in an organized way. Instead of the under-trailer airflow creating huge aerodynamic drag components from positive pressure vectors developed by hitting undercarriage components only, there are drag vector components generated by negative aerodynamic pressures. These negative pressures under the trailer are very similar to the low-pressure area found at the rear of the trailer commonly called a vacuum area. This low-pressure area behind the tractor is increasing along with the development and implementation of newer aerodynamic tractor designs. These designs create low-pressure areas behind the tractor especially when they employ deep skirts along the lower outside edges of the tractor.

All of these teachings fail to take full advantage of their aerodynamic concepts because they add what can be referred to as device drag. The addition of the side-mounted skirts on the tractor and/or the trailer has the effect of increasing the flat plate drag area at the rear of these components. Shielding devices add negative pressure zones directly behind them on the lee side of the devices. The lee side of any shield cancels out a portion of the aerodynamic improvement gains that may occur by moving the air along their curved, up wind surfaces. Undercarriage airstream deflectors cannot do noticeable work without an organized airflow. If airstream deflector designs end in solid shapes they will contribute to chaotic airflows just as a flat plate is known to do.

All of these afore mentioned teachings relate some kind of perceived improvement for the trailer axle assembly area. None have consideration for the completely chaotic and turbulent airflow that actually exists under and behind the truck and the trailer as a whole unit. Therefore none of these teachings ever suggest that an improvement can be had if the mass and velocity of the airflow under the trailer is increased.

None of these teachings of under-trailer mounted devices provide a way to automatically move the device with the trailer axle assembly. The limited aerodynamic benefits that may occur are negated when the axle location is moved away from those devices. In fact, it has been found that when a trailer axle assembly is moved away from trailer side skirt deflectors the effect in a side wind is to create an increase in aerodynamic drag.

No consideration of said teachings provide a means to easily remove them for maintenance access or replacement of their devices should they become damaged in some accidental way.

OBJECTS AND ADVANTAGES

Accordingly, several objects and advantages of the present invention are:
(a) airflow modifiers that provide superior under-trailer airflow smoothing;
(b) airflow modifiers that provide superior airflow smoothing behind the trailer;
(c) airflow modifiers that provide enhanced reduction of splash and spray due to the combined effects of airflow modifiers under the trailer, greatly improving highway safety for all motoring public;
(d) to provide airflow modifiers that supply additional cooling to trailer brakes, tires and wheels due to superior airflow management;
(e) to provide increased trailer stabilization due to the new airflow enveloping or 'cocooning' that decreases side wind loading effects and reduces side wind-effect rollover accidents;
(f) airflow modifiers that improve fuel consumption performance;
(g) airflow modifiers that improve fuel consumption performance when the truck and trailer are experiencing the effects of side and quartering wind;
(h) to provide a means of shielding and protection for trailer suspension components such as axles, airlines, brake canisters etc. from road debris;
(i) to provide a simple mounting system that requires no drilling of trailer under-frame components;
(j) to provide an airflow modifier coupled to the trailer axle assembly;
(k) to provide an airflow modifier with a means to move automatically with the trailer axle assembly as said axles are adjusted to meet bridge law axle distance requirements;
(l) to provide an airflow modifier a means to move with the trailer axles to allow for legal weight distribution settings.
(m) To provide airflow modifiers that are out of the way for maintenance access;
(n) To provide airflow modifiers that are easily replaced when damaged.

BRIEF SUMMARY OF THE INVENTION

The present invention is an improved under-trailer aerodynamic control system comprised of a plurality of airflow modifiers working together that re-directs and smooths out the chaotic, unstable airflows normally seen to exist under a trailer and behind a tractor and trailer. The system also works when installed on multiple coupled trailers.

The system uses forward and outboard mounted under-trailer airflow modifiers that smooth out and increase the air's mass, velocity and organization. The forward modifiers feed a rear-mounted airflow-modifying device that divides the airflow into a plurality of component streams. One central airflow stream works to increase the air's mass and velocity. This large volume, high-speed airflow is forced to exit between the tires thus producing a low-pressure area below and behind the trailer doors. The air that is moving along the exterior sidewalls of the trailer is now drawn down around the back corners of the trailer to combine and blend into the exit air below in a smooth manner. The reduction of the parasitic aerodynamic drag previously caused by the flat plate shape of the rear doors thereby substantially increases fuel mileage. Splash and spray is reduced as the surrounding air is drawn into the low-pressure area near the roadway. The outboard sections of the rear airflow modifier work to route impinging air to flow up, over and around the trailer tires reducing aerodynamic drag of those elements. The rear airflow modifying section is made to mount firmly and movable to the underside of a trailer.

Accordingly, several objects and advantages of the invention are to provide increased spray and splash control, to provide cooler running tires and brakes, to reduce aerodynamic drag that increases fuel mileage and provide enhanced trailer handling that reduces driver fatigue. Still further objects and advantages will become apparent from a study of the following description and the accompanying drawings.

REFERENCE NUMERALS

II Front Airflow Modifier
III Rear Airflow Modifier
1 Driver Side Rib
2 Center Rib
3 Passenger Side Rib
4 Lower Mount Bracket
5 Anti-Racking Plate
6 Lower Mount Bolt
7 Lower Mount Nut
8 Upper Mount
9 Brace
10 Trailer Tires
11 Truck Drive Tires
12 Trailer Axle Frame (Bogey)
13 Trailer Frame I-Beam
14 Trailer Floor
15 Bar Bolt
16 Bar Nut
17 Upper Mount Nut
18 Upper Mount Bolt
19 Airfoil Upper
20 Airflow Lower
21 Driver Side Rib Cap
23 Passenger Side Rib Cap
24 Driver Side Vertical Panel
25 Passenger Side Vertical Panel
27 Top Bar
29 Bottom Bar
30 Brace
32 Airflow Arrows
33 VHB (Very High Bonding) Tape
36 Winglet
40 Trailer
41 Landing Gear
50 Truck
R Road

DETAILED DESCRIPTION OF THE INVENTION

Operation—Aerodynamics

Figure 1:
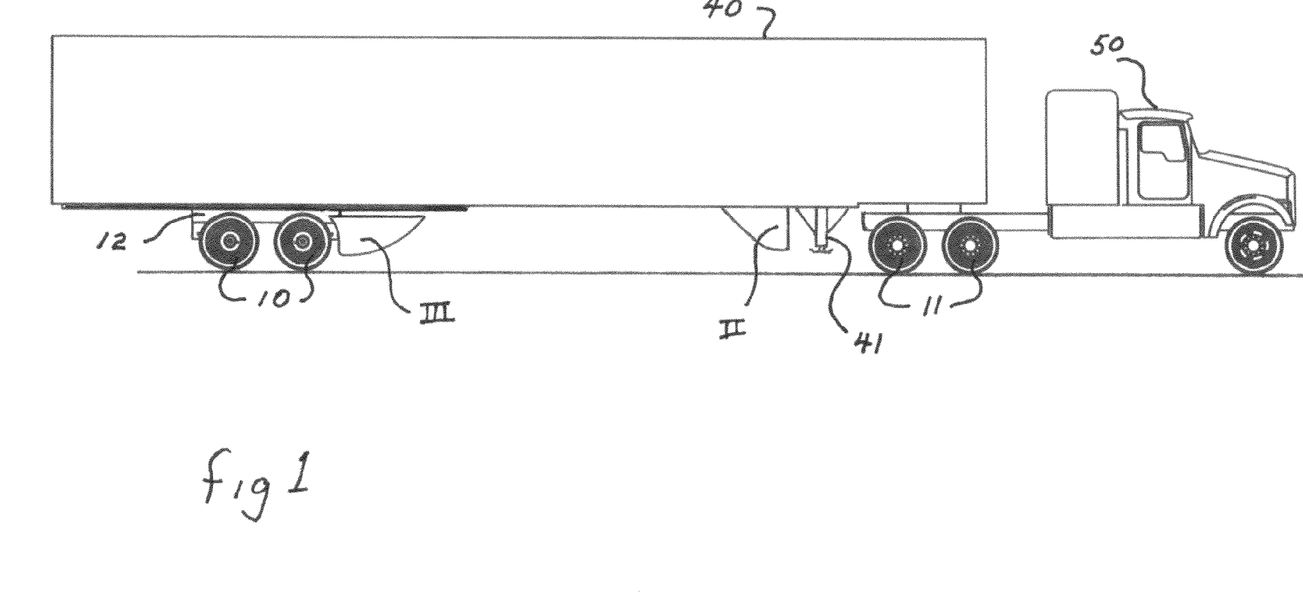
FIG. 1. Is a side view of a semi-truck 50 and trailer 40 combination. The invention component II is located behind the trailer landing gear 41. The invention component III is located ahead of the trailer tires 10 and trailer axle frame 12.
Figures 12, 13:
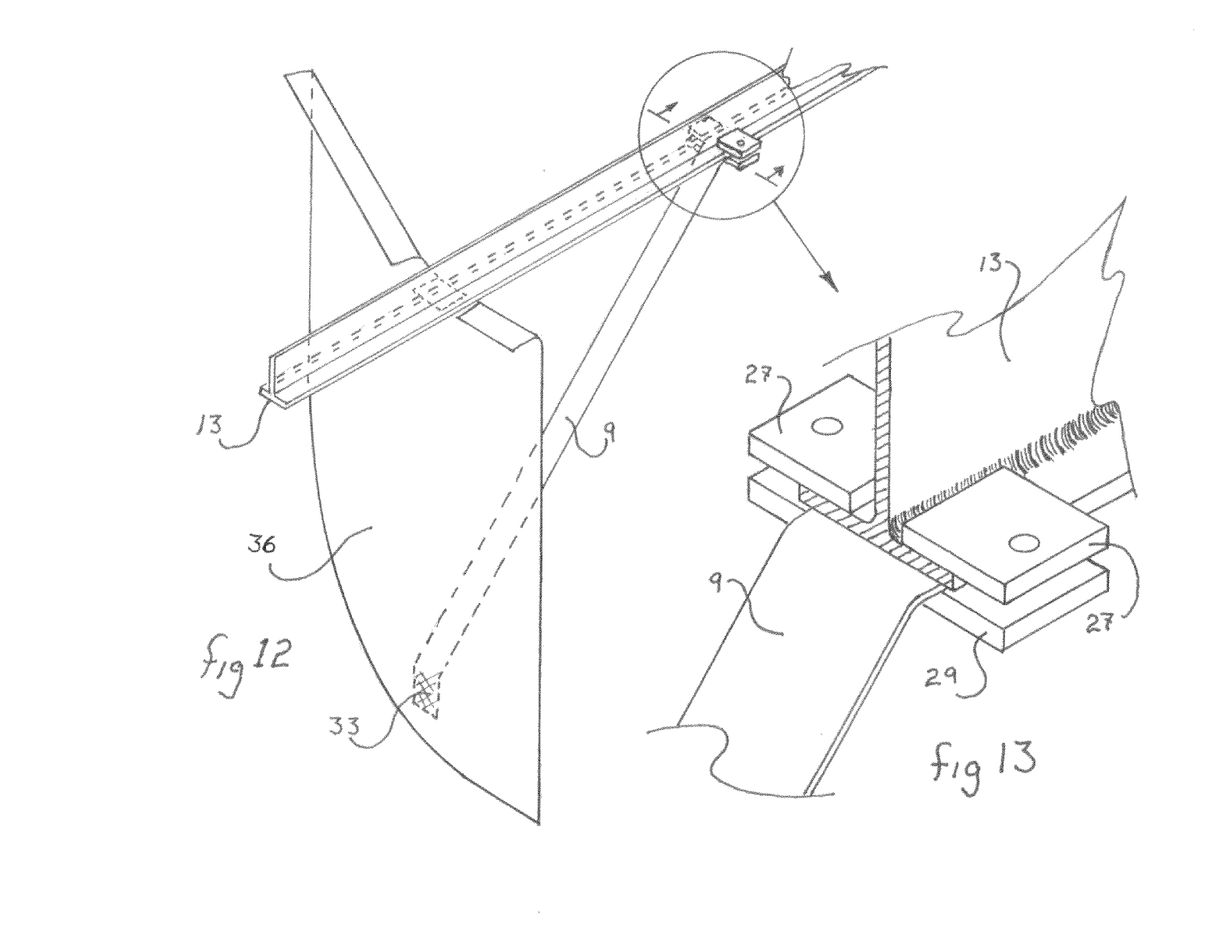
FIG. 12 Is an isometric view of invention components II.
FIG. 13 is an enlarged isometric view of connection Upper Brace 30 to Trailer I-Beam 13 using Bottom Bar 29 and Top Bars 27. Bar Bolt 15 and Bar Nut 16 NOT shown for clarity.

In operation, the forward mounted invention components II direct airflow passing by the outside boundary of trailer 40 towards invention component III. The airflow modifiers in this embodiment of component II are placed such that the inside surfaces are shielded from impinging airflow by the landing gear 41. This placement reduces induced drag that would normally be found on the inside surfaces of invention components II if allowed full presentation to passing airflow. The shape of the outboard surfaces of invention components II are designed to maintain a boundary layer condition while changing the direction of the airflow towards the centerline of invention component III. There are multitudes of means for component II arrangements that will work to direct air back towards component III. One other embodiment could be constructed of smaller panels and arrayed to change the airflow from a vertical column to one rotated to a horizontal column.

Figure 2:
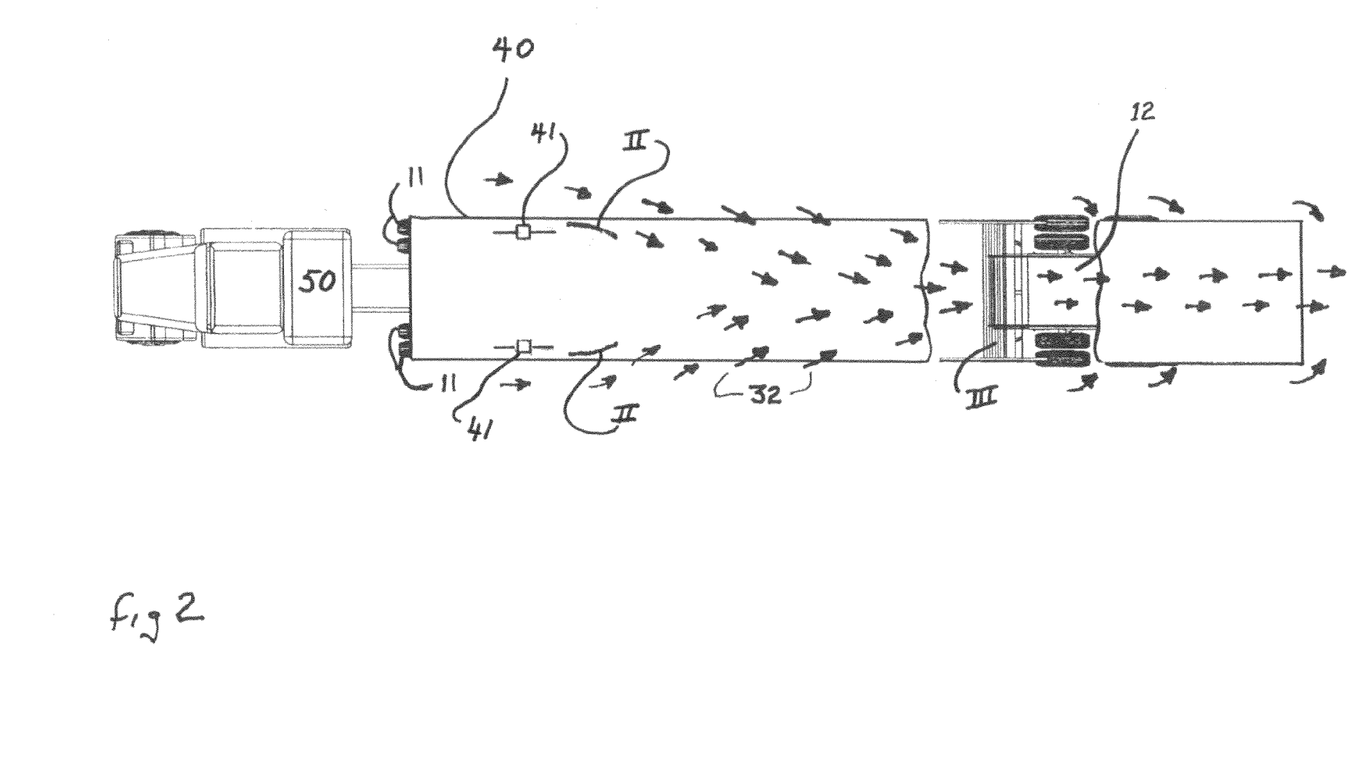
FIG. 2. Is a cut-away view from above of invention component III of a semi-truck 50 and trailer 40 showing the airflow arrows 32 as the air forms due to the invention components traveling down the highway at speed. The forward mounted invention components II are located behind the trailer landing gear 41.
Figure 3:
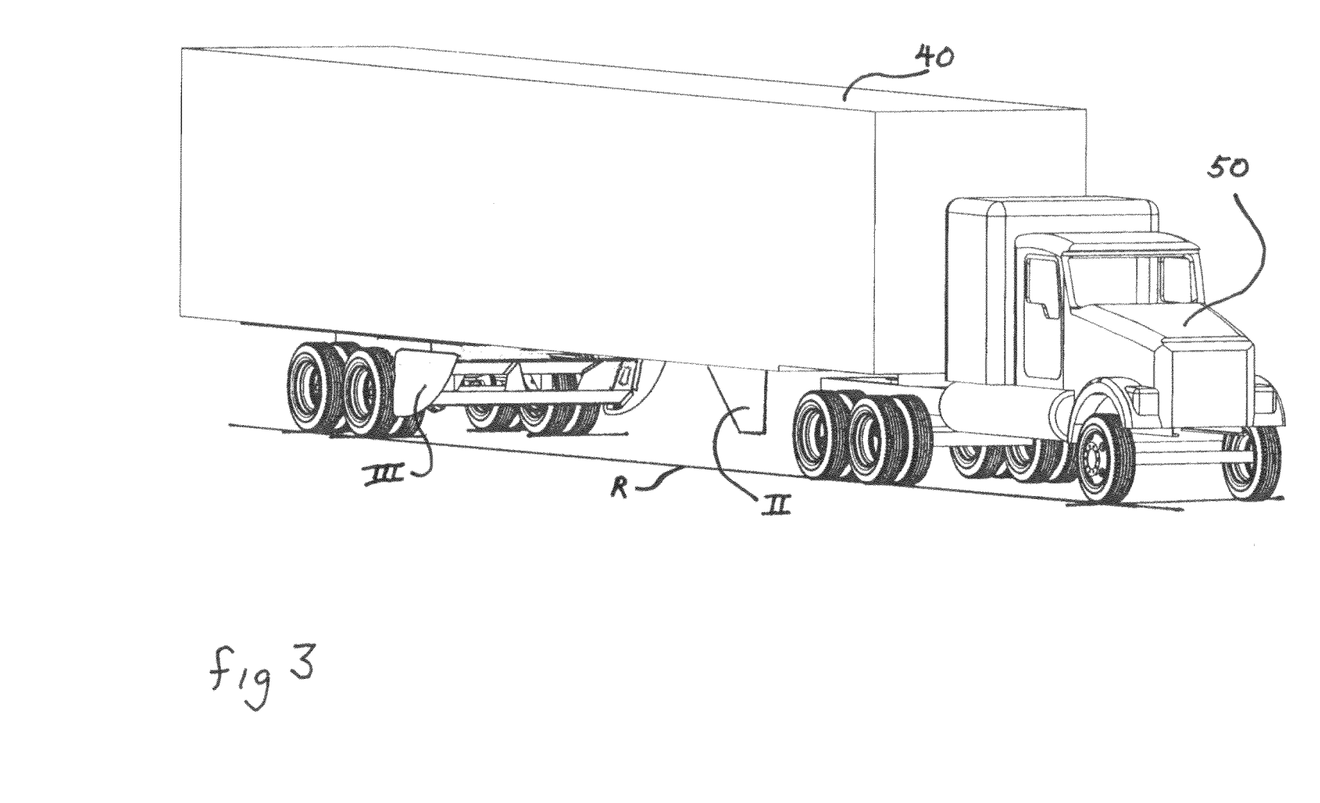
FIG. 3. Is a perspective view of the invention as viewed from the passenger side, ahead, and to the left of centerline.

As viewed from above the two forward panels are connected to the underside of the trailer and placed on an aerodynamic angle alignment from the outer edge of the trailer towards the center of the rear airflow modifier. These outer panels direct voluminous amounts of organized air towards the rear mounted airflow modifier. The forward panels have a chord length kept short as possible to reduce induced drag. The space under the trailer and between said forward airflow modifiers and said rear-mounted airflow modifiers are kept open to allow for side winds to blow through. The open area also allows for any rearward moving off-axis winds to penetrate through to the rear airflow modifier section. This wind action will enhance the new flow characteristics developed by said modifier sections, further reducing the flat-plate drag of said trailer door area.

Figure 4:
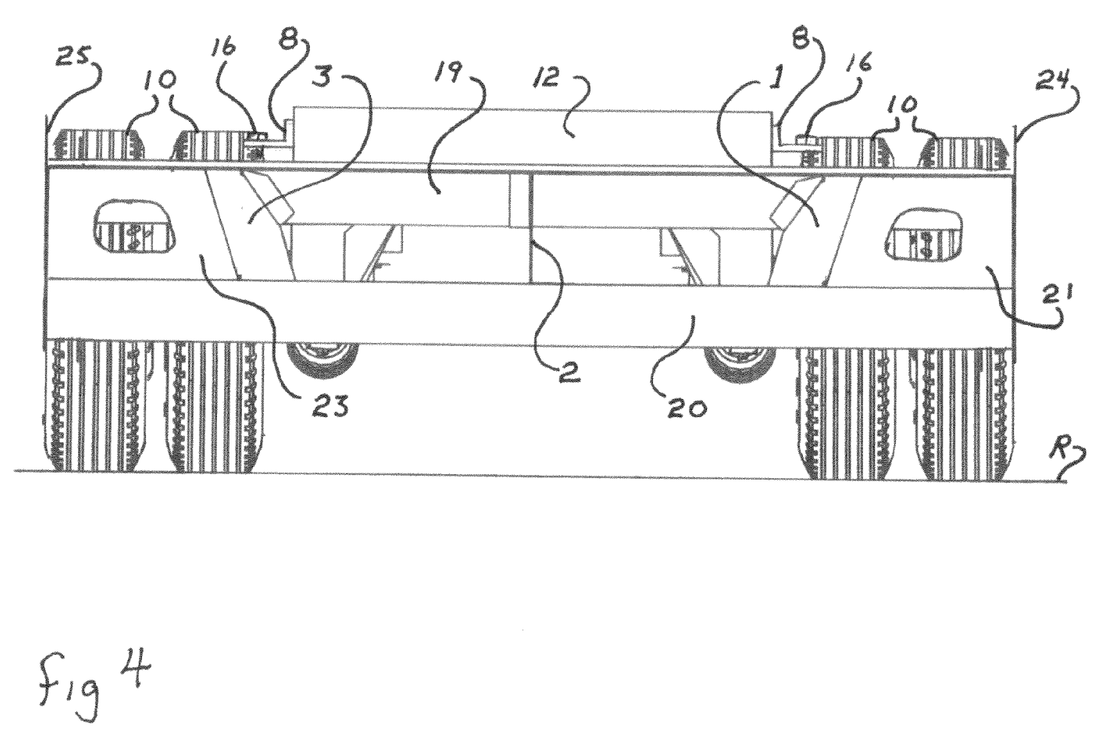
FIG. 4. Is a view of the invention component III as viewed from the front with the trailer 40 box removed for clarity. The airfoil upper 19 and the airfoil lower 20 are separated by the driver side rib 1, center rib 2, and passenger side rib 3. This view shows how driver side rib 1 and passenger side rib 3 are angled to direct the impinging air away from tires 10 and towards the centerline location parallel to center rib 2. The relationship between upper mounts 8, upper mount bolts 16 and airfoil upper 19 can be seen in this frontal view of rear airflow modifier III.
Figure 5:
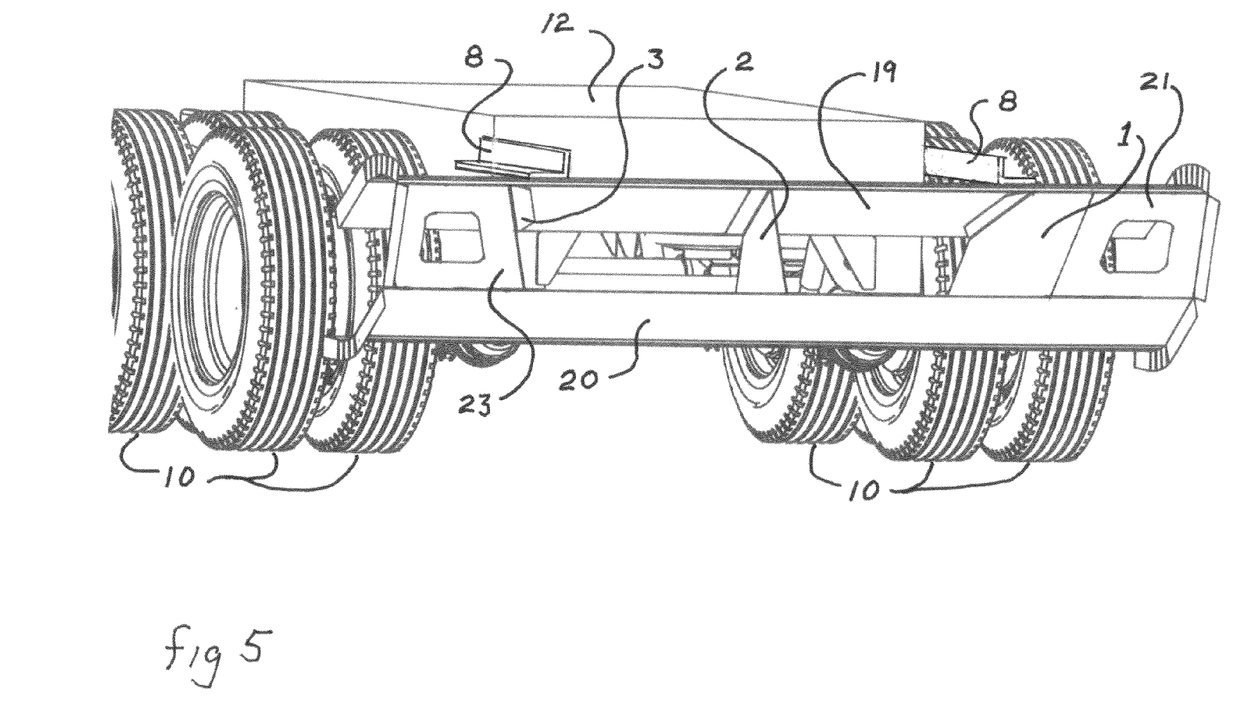
FIG. 5. Is a view of the invention component III as viewed from ahead and to the left with the trailer 40 box removed for clarity. The driver side vertical panel 24 and passenger side vertical panel 25 are removed for clarity. The relationship between airfoil upper 19 and airfoil lower 20 to driver side rib 1 and center rib 2 and passenger side rib 3 are seen in this view. The driver side end cap 21 and passenger side end cap 23 placement relative to the outboard ribs of 1 and 3 and airfoil upper 19 and airfoil lower 20 can be seen. The relationship of upper brackets 8 to trailer axle frame (bogey) 12 and airfoil upper 19 are shown without upper mount bolts 16 in place for clarity.

Invention component III collects the air that impinges upon the airfoil upper 19 and airfoil lower 20 and is kept from exiting laterally by driver side vertical panel 24 and passenger side vertical panel 25. Driver side rib 1 and passenger side rib 3 have their vertical sections angled towards the centerline of trailer 40. This angle can be seen clearly in FIG. 4. This arrangement produces an increased velocity of airflow that exploits a venturi effect from the impinging air. The forward extension of driver side vertical panel 24 and passenger side vertical panel 25 beyond the forward edges of the two airfoils 19 and 20 are predetermined to avoid unnecessary aerodynamic drag. One embodiment of this is seen in FIG. 8A. The easiest path for the airflow is to exit the center section between driver side rib 1 and passenger side rib 3 down towards the ground and back between the trailer tires 10, see FIG. 4. The airflow exiting this area then pulls down the airflow over the top of airflow upper section 19 to also exit underneath the trailer axles. The high speed air exiting the center section also pulls the airflow from the sides and below airfoil lower 20 keeping it from impinging on the lower section of trailer tires 10. This airflow modification reduces splash and spray from the tires 10. The driver side rib-cap 21 and the passenger side rib-cap 23 re-directs the airflow jut ahead of trailer tires 10 to move either down towards the ground, towards the centerline of trailer 40 and up and over the top portions of tires 10. The opening in the face of rib-caps 21 and 23 lowers the incidence of device drag and keeps the area behind them clean of material kicked up by the tires directly behind, see FIG. 4.

The ensuing pressurized air in the center section between airfoil upper 19 and lower 20 and driver side rib 1 and passenger side rib 3 must exit at a greater velocity, thus forming a high velocity, negative pressure area between the tires that exits well past the end of the trailer. This low-pressure area now draws air from beyond the trailer tires towards the centerline of the vehicle bringing with it any rain, snow or dust from the roadway as depicted in FIG. 2. The air is forced continually towards the rear of the trailer as the devices and trailer continues forward down the road. The air now exits the rear of the trailer at a velocity that creates a low-pressure area low and behind the trailer. This airflow draws the surrounding air down around the rear vertical corners of the trailer 40. This new airflow removes the normally existing low-pressure area found at the back doors of the trailer 40. The high velocity airflow beneath the trailer keeps any road spray down low to the roadway R again reducing spray and splash enhancing safety by increasing visibility for both the truck driver and other nearby motorists.

Figure 8:
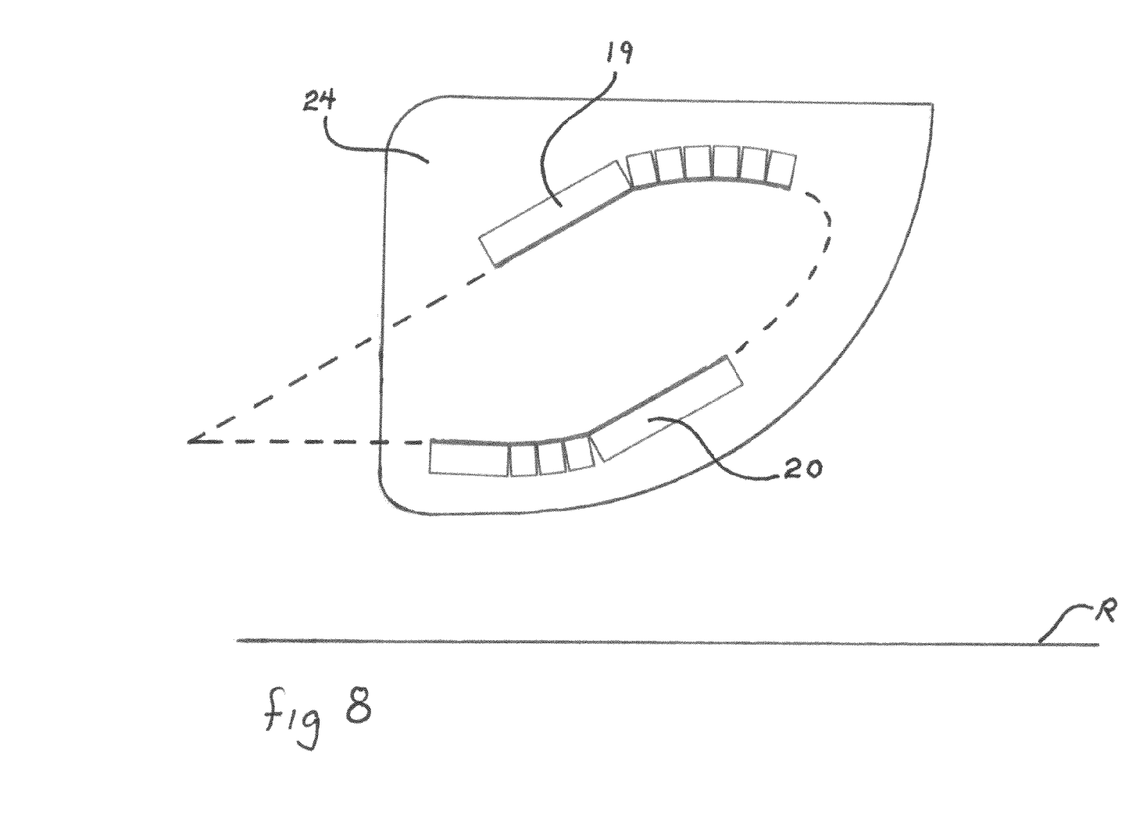
FIG. 8 Is a side view from mid-point centerline of airfoils upper 19 and lower 20 towards the inside of driver side vertical panel 24. The drawing shows relative relationships between top edge of driver side vertical panel 24 to upper airfoil 19 and to lower airfoil 20 and to road R. Dashed lines connecting airfoil 19 to airfoil 20 represents removed portion of a 'standard' aircraft wing form.
Figure 8A:
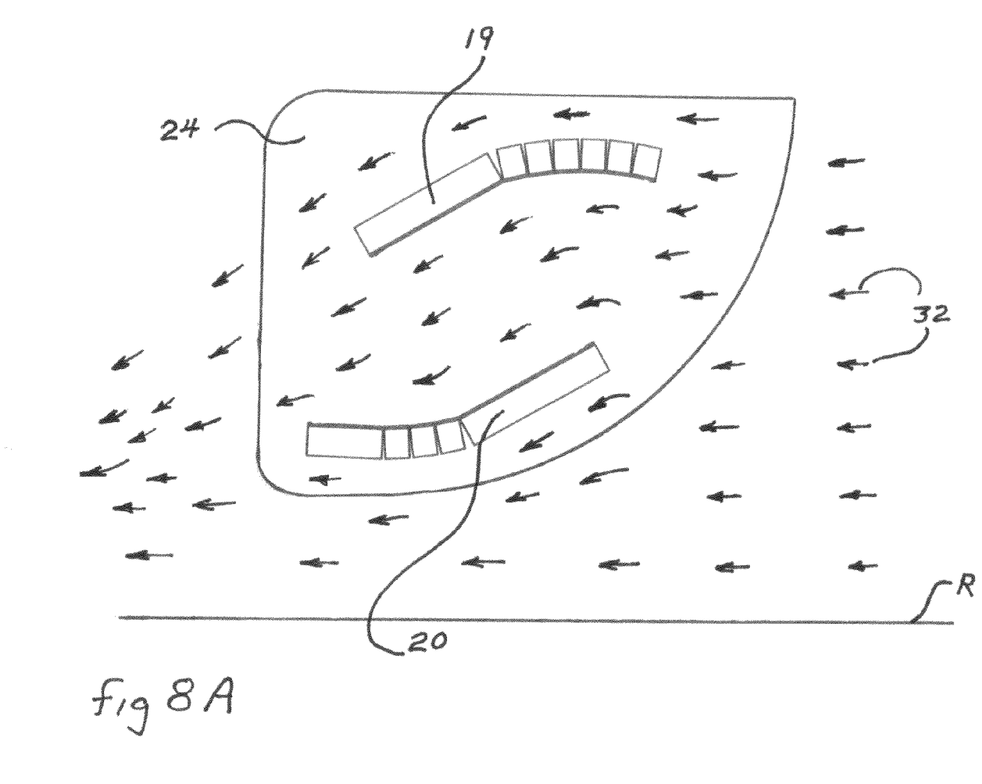
FIG. 8A Same view as 8 except showing airflow using Air Flow Arrows 32. The dashed lines of the missing wing components from FIG. 8 are not shown.
Figure 9:
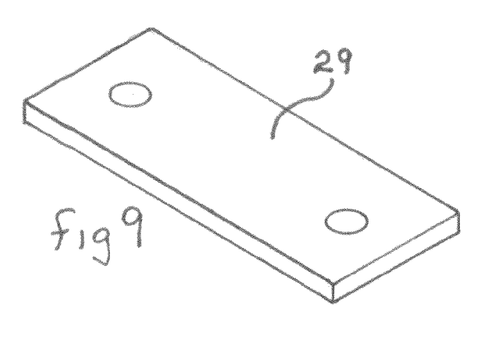
FIG. 9 Is an isometric view of Bottom Bar 29.
Figure 10:
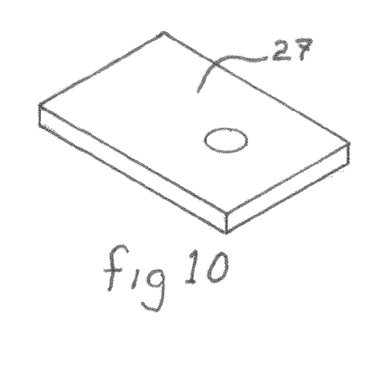
FIG. 10 Is an isometric view of Top Bar 27.

FIG. 8 shows how the two profiles of airfoil upper 19 and airfoil lower 20 are segments of an aircraft wing form with the forward and rear sections removed. Aircraft wings must be able to rotate up and down as the aircraft changes position while flying therefore the wing profile is enclosed. Our trailer is only presented with air in a single direction, thus no solidly enclosed wing form is required. An aircraft wing is designed to supply lift by changing the airflow path and its velocity. The purpose for the invention component III is to change the airflow path and velocity without creating lift and drag components. Said component III is mounted to a land vehicle—a trailer—that will not require different angles of attack so the wing profiles can remain static. Therefore, we can remove the front and rear sections of the wing and use both sides of the remaining sections to move the air in a similar way for the least cost in aerodynamic drag as possible. The new airflow due to said component III can be seen in FIG. 8A. FIG. 8A shows the relationship between the airfoil upper 19 and the airfoil lower 20 and how they work together to shape the airflow to do work instead of producing chaotic device drag that any shielding device would produce.

The new configuration of airfoil upper 19 and airfoil lower 20 are trimmed portions of a wing shape. This is the benefit of the invention component III. With the forward and aft sections of the wing profile removed we get the benefits of the wing shape without the weight and bulk. This new design also reduces the amount of device drag, as the aerodynamic wetted area is now smaller. The flow-through design is much more efficient in modifying the airflow as can be seen in FIG. 8A because the air travels less distance from the forward section to the aft section then using the route defined by the outside shape of a full airfoil as depicted in FIG. 8.

Operation—Mechanical

Proper placement for any aerodynamic device is a key element to its usefulness. The trailer axle design in use today is such that it presents very limited and distinct locations for any airflow to occur unhindered. Invention component III is designed to take advantage of these route opportunities for maximum air flow-through. Class 8 truck trailers are designed with moveable trailer axle assemblies called bogeys. Therefore, component III is designed to move with said bogeys so that the airflow routes are preserved no matter what location the bogeys are in.

Figure 6:
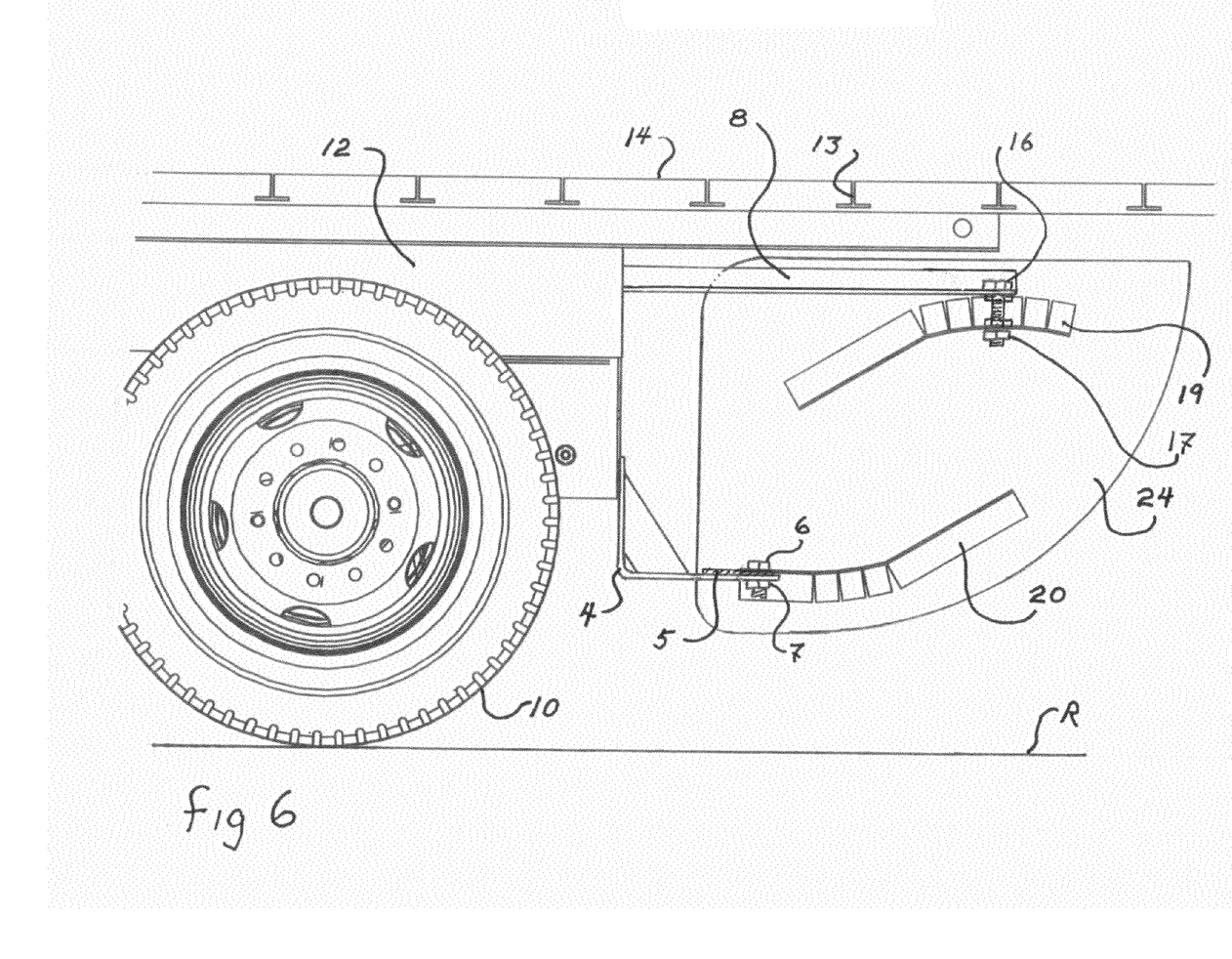
FIG. 6. Is a side view of invention component III with a cutting plane from left to right through the center of airfoil upper 19, airflow lower 20. The passenger side half has been removed for clarity. This view shows the relationship between airfoil upper 19 to airfoil lower 20 and the construction tape tab locations of both airfoils 19 and 20. The relationship between component III to the trailer axle frame 12 and trailer frame I-beams 13 can be seen in this view. The driver's side upper mount 8, upper mount bolt 16 with upper mount nut 17, lower mount bracket 4, lower mount anti-racking plate 5 and lower mount bolt 6 with lower mount nut 7 are shown here.

In FIG. 6 we can see the elements of invention component III and the means to have invention component III move with said bogey. Upper mount brackets 8 are substantially attach to the trailer axle frame (bogey) 12 by any acceptable means IE bolts, welding etc. At the forward end of upper mount brackets 8 are connection bolts 16 with upper mount nuts 17. The two upper mount bolts are long enough to penetrate through the airfoil upper 19 with enough length to penetrate through upper mount nuts 17. There are three upper mount nuts per upper mount bolt. The first bolt and nut capture the upper mount 8. The second pair of nuts capture the airfoil upper 19 and provides a means to adjust the horizontal alignment of the invention component III to the bottom of trailer 40.

Figure 7:
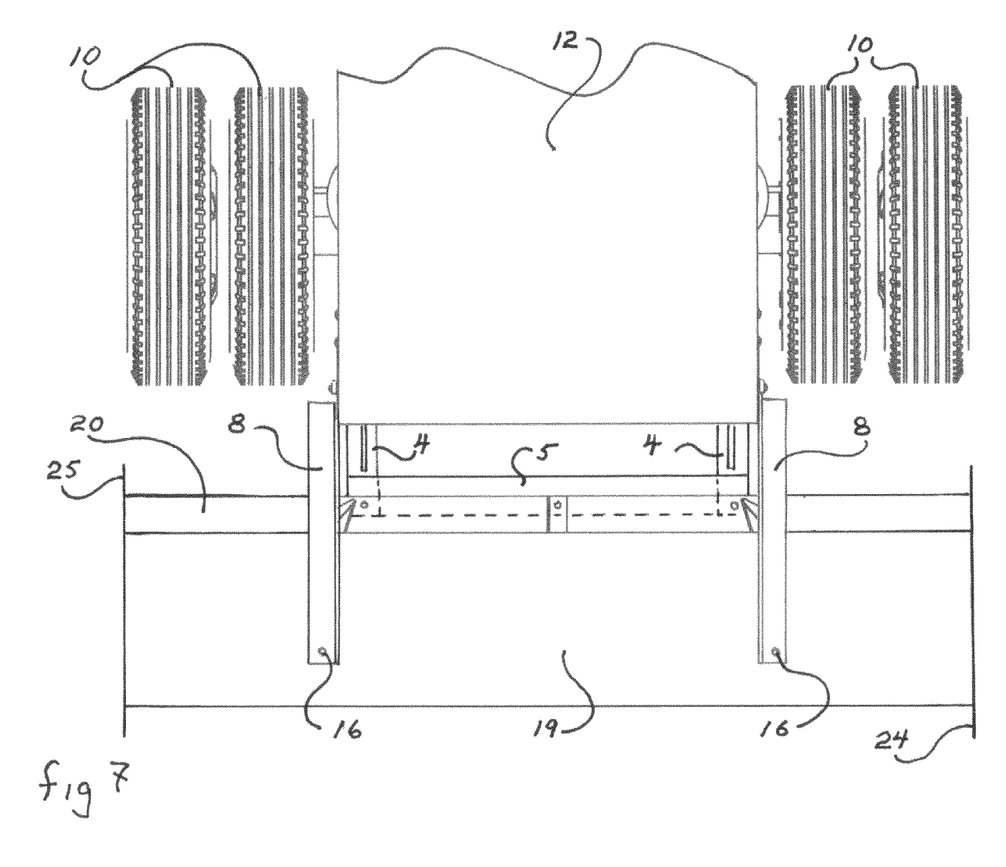
FIG. 7 Is the top view of invention component III as it relates to the bogey 12. Identifying parts beginning from above we have the upper mounts 8 with upper mount bolts 16. Below these are lower brackets 4 with anti-racking plate 5

The side view of FIG. 6 shows an arrangement to attach the airfoil lower 20 to the bogey 12 using the means of lower bracket 4. In this embodiment the top portion of the vertical section of lower mount 4 is welded to the lower portion of bogey 12. FIG. 7 shows the relationship of anti-racking plate 5 to lower brackets 4 and airfoil lower 20. The anti-racking plate 5 provides a means to eliminate or control any excessive lateral side-to-side movement that may develop during normal operation of the trailer 40.

All panels of invention component II and III are comprised of ⅛" thick aluminum sheets. The panels of invention component III and the brace 9 to winglet 36 are connected to each other in a contiguous manner using 3M VHB (Very High Bonding) double-sided construction tape. Said tape is comprised of a plastic backing medium that absorbs extreme vibrations found existing on the trailer during loading, unloading and traveling down the road. Both sides of the backing are coated with a strong adhesive that when applied properly, out-performs any other connection strategy whether welding, bolts or rivets. The plastic medium provides the aluminum panels with the required flexibility to survive the harsh conditions found to exist under a trailer. A flexible adhesive may be able to replace the tape.

Figure 11:
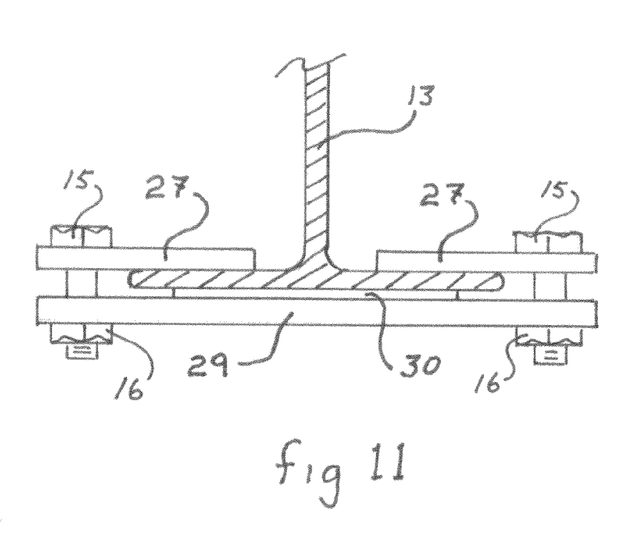
FIG. 11 Is side view of Trailer Frame I-Beam 13 showing a typical connection of Brace 30 to said I-Beam using Bottom Bar 29 and two Top Bars 27 with Bar Bolts 15 and Bar Nuts 16.

The bottom bar 29 and top bars 27 are used to sandwich in a firm manner the flanges of trailer frame I-beam 13 and the top folded edge of the forward winglets 36 and braces 9.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. An aerodynamic airfoil system for a trailer, comprising:
an airflow modifier assembly being mountable to an underside of a trailer and having spaced apart upper and lower airfoil members each having first and second ends, said upper and lower airfoil members joined together adjacent said first ends by a first outer rib member and joined together adjacent said second ends by a second outer rib member, said first and second outer rib members being angled to direct an airflow toward a central area of said airflow modifier; and
first and second front end airflow panels that are attachable adjacent to front left and right sides of a trailer, respectively, and having a shape that directs airflow toward said airflow modifier assembly, when attached to opposing front sides of a trailer;
first and second rear end airflow panels that are attachable adjacent to rear left and right sides of a trailer, respectively, and adjacent said airflow modifier assembly, and each having a shape that inhibits airflow from exiting from beneath a trailer adjacent said airflow modifier assembly, when attached to opposing rear sides of a trailer.

2. The aerodynamic airfoil system of claim 1 further comprising a center rib member located in a center of said airflow modifier assembly and joining centers of said upper and lower airfoil members.

3. The aerodynamic airfoil system of claim 1 further comprising,
a first rib cap located adjacent said first side outer rib member and attached to said upper and lower airfoil members at said respective first ends; and
a second rib cap located adjacent said second outer rib member and attached to said upper and lower airfoil members at said respective second ends.

4. The aerodynamic airfoil system of claim 1 wherein said upper and lower airfoil members are aerodynamically shaped to direct airflow through a space located between said upper and lower airfoil members and downwardly from said airflow modifier assembly and direct airflow over and under, and in a downward direction from said airflow modifier assembly.

5. The aerodynamic airfoil system of claim 1 further comprising a bracket system for attaching said airflow modifier assembly to an underside of a trailer.

6. The aerodynamic airfoil system of claim 5, wherein the bracket system includes an upper mounting bracket that attaches the upper airfoil member to an underside frame of a trailer and a lower mounting bracket that attaches the lower airfoil member to an underside frame of a trailer.

7. The aerodynamic airfoil system of claim 6, wherein said lower mounting bracket further includes a racking plate that is separately attachable to said lower mounting bracket.

8. An aerodynamic airfoil system for a trailer, comprising:
an airflow modifier assembly being mountable to an underside and between rear tires of a trailer and having spaced apart upper and lower airfoil members each having first and second ends, said upper and lower airfoil members joined together adjacent said first ends by a first outer rib member and joined together adjacent said second ends by a second outer rib member, said first and second side outer rib members angled to direct an airflow toward a central area of said airflow modifier.

9. The aerodynamic airfoil system of claim 8 further comprising:
first and second front end airflow panels that are attachable adjacent to front left and right sides of a trailer, respectively, and each having a shape that directs airflow from a front area of said trailer towards said airflow modifier assembly.

10. The aerodynamic airfoil system of claim 8 further comprising:
first and second rear end airflow panels that are attachable adjacent to rear left and right sides of a trailer, respectively, and adjacent said airflow modifier assembly, and each having a shape that inhibits airflow from exiting from beneath said trailer adjacent said airflow modifier assembly, when attached to opposing rear sides of a trailer.

11. The aerodynamic airfoil system of claim 8 further comprising a center rib located in a center of said airflow modifier assembly and joining centers of said upper and lower airfoil members.

12. The aerodynamic airfoil system of claim 8 further comprising,
a first rib cap located adjacent said first side outer rib member and attached to said upper and lower airfoil members at said respective first ends; and
a second rib cap located adjacent said second outer rib member and attached to said upper and lower airfoil members at said respective second ends.

13. The aerodynamic airfoil system of claim 8 wherein said upper and lower airfoil members are aerodynamically shaped to direct airflow through a space located between said upper and lower airfoil members and downwardly from said airflow modifier assembly and direct airflow over and under, and in a downward direction from said airflow modifier assembly.

14. The aerodynamic airfoil system of claim 8 further comprising a bracket system for attaching said airflow modifier assembly to an underside of a trailer.

15. The aerodynamic airfoil system of claim 14, wherein the bracket system includes and upper mounting bracket that attaches the upper airfoil member to an underside frame of a trailer and a lower mounting bracket that attaches the lower airfoil member to an underside frame of a trailer.

16. The aerodynamic airfoil system of claim 15, wherein said lower mounting bracket further includes a racking plate that is separately attachable to said lower mounting bracket.

17. A truck trailer having aerodynamic airfoil system attached thereto, comprising:
a truck trailer having an underside support frame and a rear axle frame and front end landing gear;
an airflow modifier assembly being mountable to an underside of a trailer and having spaced apart upper and lower airfoil members each having first and second ends, said upper and lower airfoil members joined together adjacent said first ends by a first outer rib member and joined together adjacent said second ends by a second outer rib member, said first and second outer rib members being angled to direct an airflow toward a central area of said airflow modifier; and
first and second front end airflow panels that are attachable adjacent to front left and right sides of a trailer, respectively, and having a shape that directs airflow toward said airflow modifier assembly, when attached to opposing front side of a trailer;
first and second rear end airflow panels that are attachable adjacent to rear left and right sides of a trailer, respectively, and adjacent said airflow modifier assembly, and each having a shape that inhibits airflow from exiting from beneath a trailer adjacent said airflow modifier assembly, when attached to opposing rear sides of a trailer.

18. The aerodynamic airfoil system of claim 17 further comprising a center rib member located in a center of said airflow modifier assembly and joining centers of said upper and lower airfoil members.

19. The aerodynamic airfoil system of claim 17 further comprising,
a first rib cap located adjacent said first side outer rib member and attached to said upper and lower airfoil members at said respective first ends; and
a second rib cap located adjacent said second outer rib member and attached to said upper and lower airfoil members at said respective second ends.

20. The aerodynamic airfoil system of claim 17 wherein said upper and lower airfoil members are aerodynamically shaped to direct airflow through a space located between said upper and lower airfoil members and downwardly from said airflow modifier assembly and direct airflow over and under, and in a downward direction from said airflow modifier assembly.

21. The aerodynamic airfoil system of claim 17 further comprising a bracket system for attaching said airflow modifier assembly to an underside of a trailer.

22. The aerodynamic airfoil system of claim 21, wherein the bracket system includes an upper mounting bracket that attaches the upper airfoil member to an underside frame of a trailer and a lower mounting bracket that attaches the lower airfoil member to an underside frame of a trailer.

23. The aerodynamic airfoil system of claim 22, wherein said lower mounting bracket further includes a racking plate that is separately attachable to said lower mounting bracket.

* * * * *